F. W. HOFFMANN.
MOLD.
APPLICATION FILED MAY 22, 1909.
945,537.
Patented Jan. 4, 1910.
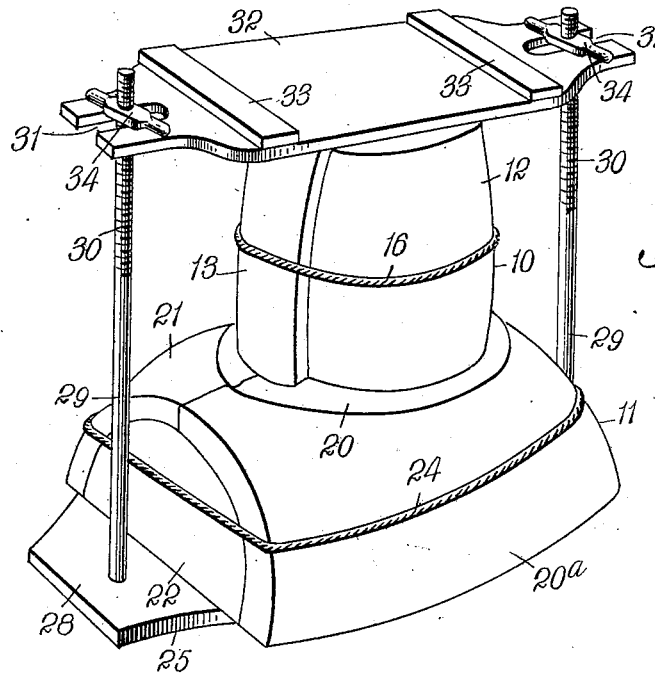
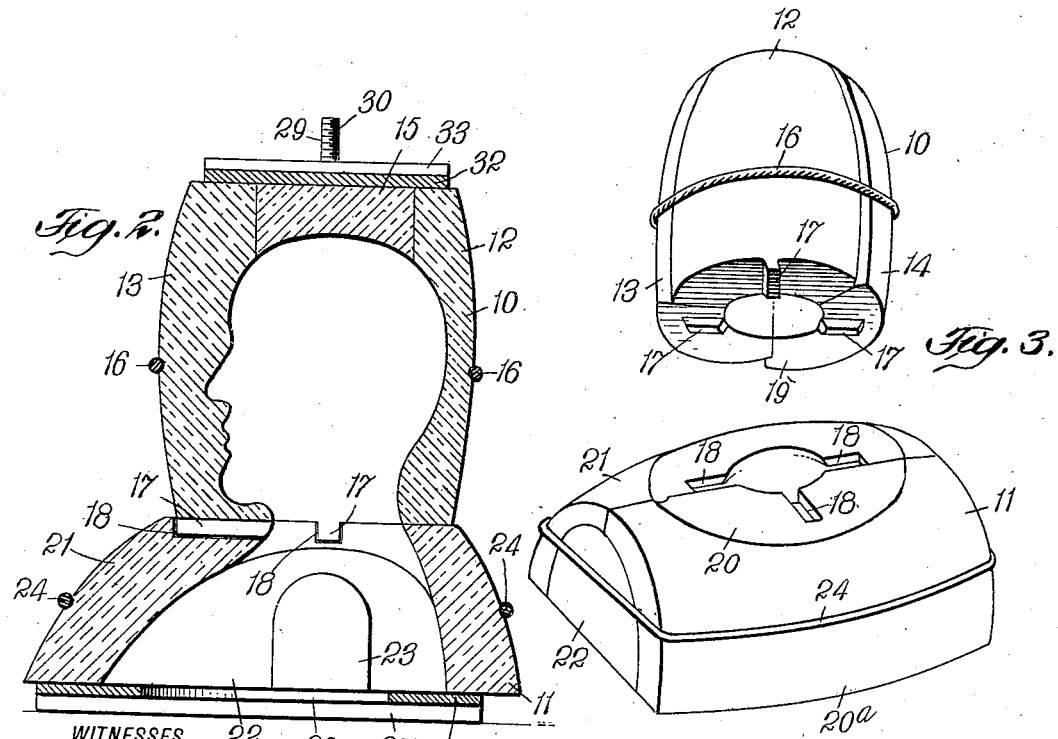
WITNESSES
INVENTOR
Frederick W. Hoffmann
BY
Criswell & Criswell
ATTORNEYS

UNITED STATES PATENT OFFICE.

FREDERICK W. HOFFMANN, OF WEEHAWKEN, NEW JERSEY.

MOLD.

945,537.  Specification of Letters Patent.  Patented Jan. 4, 1910.

Application filed May 22, 1909. Serial No. 497,672.

*To all whom it may concern:*

Be it known that I, FREDERICK W. HOFF-MANN, a citizen of the United States, and a resident of Weehawken, county of Hudson, and State of New Jersey, have invented certain new and useful Improvements in Molds, of which the following is a full, clear, and exact description.

This invention relates more particularly to a mold for wax figures employed as models.

In the manufacture of wax figures employed as models, there are several grades of the same, and the higher grades have a different form and extent of bust from that of the other grades and it is the usual practice to cast the entire head and bust in a single piece. For this purpose the mold is made sectional but the head and bust portions have their sections in one piece. As thus constructed if the mold in making the same is defective in any particular, the mold becomes useless or the bust portion of the figure must be trimmed to correspond with the lower grade or form of model, which results in the loss of much time and labor and expense. Such methods also result in much waste of material, for each figure requires the mold to be made complete, thus using the entire mold for each figure and consequently a large quantity of plaster of paris which is usually employed in such molds.

The primary object of the invention is to provide simple and efficient means whereby the mold may have two or more members, one for the head and the other for the bust, and these members so held together that the head may be used with what is known as the high grade bust form or with the second or other grades, so that if the head is at all defective, it may be used with the proper form of bust, and at the same time such means permits a small number of bust members to be employed, and in this way saves much time, labor and waste of material, for the defects, if any, usually occur in the face or head portion of the mold.

Another object of the invention is to provide simple and efficient means whereby the head and bust members, may be each made of a plurality of sections, and these sections held together to form two independent members which have interlocking parts to adapt the members to be readily taken apart or placed in position.

A further object of the invention is to provide a simple and efficient clamping frame for the mold.

With these and other objects in view, the invention will be hereinafter more particularly described with reference to the accompanying drawings, which form a part of this specification, and will then be pointed out in the claims at the end of the description.

In the drawings, Figure 1 is a detail perspective view of one form of mold embodying my invention. Fig. 2 is a vertical transverse section; and Fig. 3 are detail perspective views of the bust and head members of the mold detached.

The mold has a head member or part 10 and a bust member or part 11 and each member comprises a plurality of sections. As shown, the head member 10 comprises the main sections 12, 13 and 14 forming the face, rear, and side of the head, while the top of the mold is provided with a section 15 for the upper portion of the figure, and these sections may have their edges abutting and are adapted to have a flexible or other element 16 passed and fastened about them to hold the several sections of the head member together. The head member 10 has its head sections 12, 13 and 14 each provided with a lug or leg 17 which may be radially arranged, and these lugs are adapted to fit into recesses 18 of the bust member 11. Both members of the mold may be made of plaster of paris or other material, and the head portion is provided with a flat surface 19 which is adapted to rest upon the flat surface 20 of the member 11, and each member is made hollow and the figure may also be made hollow as is usual with molds of this kind. The member 11 is also made of a plurality of sections, one section, as 20ª, representing the front and another section 21 the rear of the bust member, and the shoulder portion of the figure is formed by the end members 22 each of which is provided with a projecting portion 23, the latter being in the form of blocks which project inward from the end pieces or sections 22. The body of the members 20ª and 21 may be grooved or notched at the corners to permit a flexible element, as a rope 24, to be passed around the same, and when fastened will hold and clamp the several sections of the bust member together. By this means the bust and head members may be quickly attached to or detached from each other, and the mold portion of the head member made to form a continuation of the mold portion of the bust member, so that the bust member may be of any desired form or shape to adapt the bust and head members to be made interchangeable.

To hold the members of the mold properly together various means may be employed. As one means, I provide a plate or board 25 of wood or other material, which board may have an opening 26 and strengthening bars or parts 27, and projecting upward from the ends or extended portions 28 are the bolts 29. These bolts 29 may be of wood or other material and have a threaded portion 30 which is adapted to pass through slots 31 of a clamping part or plate 32 of wood or other material. This plate or member 32 is adapted to extend across the head member of the mold and is provided with strengthening parts or bars 33, and adapted to hold the plate 32 to the bolts 29 are the hand ends 34. By rotating the nuts 34, the clamping boards or members 32 and 25 may be rigidly held together so that the mold members 10 and 11 will be prevented from becoming detached while casting the figure.

From the foregoing, it will be seen that simple and efficient means is provided whereby a mold for wax figures may have two members, one forming the head member and the other the bust member, which may be detachably held together so that the head and bust members may be made interchangeable; that much material, time, labor and expense is saved by making the mold in the manner set forth; that simple means is provided for holding the parts of the head and bust members together; and that simple means is provided for clamping the two members together when the mold is assembled.

Having thus described my invention, I claim as new and desire to secure by Letters Patent:—

1. A mold for wax figures, comprising a bust member having a front and rear section and two end sections, said front and rear sections being provided with recesses extending inwardly, a head member comprising three main sections and a top section and each main section being provided with a lug adapted to fit in one of the recesses of the bust member, and means whereby the sections of the head member and bust member may be held together.

2. A mold for wax figures, having a bust member provided with a front and rear section and two end sections, said front and rear sections being provided with recesses extending inwardly, and a head member comprising three main sections and a top member and each main section being provided with a lug adapted to fit in one of the recesses of the bust member.

3. A mold for wax figures, comprising a bust member having a front and rear section and two end sections, said front and rear sections being provided with recesses extending inwardly, said end sections being each provided with a projecting portion to form shoulders, a head member comprising three main sections and a top section and each main section being provided with a lug adapted to fit in one of the recesses of the bust member, and means whereby the sections of the head member and bust member may be held together.

4. A mold for wax figures, having a bust member provided with a front and rear section and two end sections, said front and rear section being provided with recesses extending inwardly, said end sections being each provided with a projecting portion to form shoulders, and a head member comprising three main sections and a top member and each main section being provided with a lug adapted to fit in one of the recesses of the bust member.

This specification signed and witnessed this 19th day of May, A. D. 1909.

FREDERICK W. HOFFMANN.

Witnesses:
   LESTER C. TAYLOR,
   M. DINNHAUPT.